(12) United States Patent
Alizadeh-Shabdiz et al.

(10) Patent No.: US 10,390,173 B2
(45) Date of Patent: *Aug. 20, 2019

(54) TECHNIQUES FOR ESTABLISHING AND USING ASSOCIATIONS BETWEEN LOCATION PROFILES AND BEACON PROFILES

(71) Applicant: Skyhook Wireless, Inc., Boston, MA (US)

(72) Inventors: Farshid Alizadeh-Shabdiz, Wayland, MA (US); Russel K. Jones, Roswell, GA (US); Richard J. Sutton, Cambridge, MA (US); Javier Velez, Cambridge, MA (US); Pathum Mudannayake, Boston, MA (US); Arun Ramamurthy, Boston, MA (US)

(73) Assignee: Skyhook Wireless, Inc., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/900,314

(22) Filed: Feb. 20, 2018

(65) Prior Publication Data

US 2018/0184241 A1 Jun. 28, 2018

Related U.S. Application Data

(63) Continuation of application No. 15/220,156, filed on Jul. 26, 2016, now Pat. No. 9,936,348.

(Continued)

(51) Int. Cl.
*H04W 4/02* (2018.01)
*H04W 4/021* (2018.01)
(Continued)

(52) U.S. Cl.
CPC ............ *H04W 4/021* (2013.01); *G06F 16/29* (2019.01); *H04L 67/18* (2013.01); *H04L 67/30* (2013.01); *H04W 4/029* (2018.02); *H04W 4/80* (2018.02)

(58) Field of Classification Search
CPC ........ H04L 67/30; H04W 4/80; H04W 4/029; H04W 4/008; H04W 4/028
(Continued)

(56) References Cited

U.S. PATENT DOCUMENTS 7,433,694 B2 10/2008 Morgan et al.
8,233,913 B2 7/2012 Mendis
(Continued)

FOREIGN PATENT DOCUMENTS

WO WO-2015/006690 A1 1/2015

*Primary Examiner* — Congvan Tran
(74) *Attorney, Agent, or Firm* — Cesari and McKenna, LLP; James A. Blanchette

(57) ABSTRACT

In one embodiment, techniques are provided to establish and use semantic associations between location profiles and ambient profiles. One or more location profiles are selected from a location database. A first plurality of ambient profiles is selected for a first area surrounding one or more geographic locations of the location profiles. One or more patterns are extracted from the first plurality of ambient profiles and are used to generate associations between location profiles and ambient profiles in an association database which semantically associates location profiles with ambient profiles independent of geographic location. The associations may be used, among other things, to service requests from mobile devices and/or update ambient profiles or location profiles.

20 Claims, 8 Drawing Sheets

Related U.S. Application Data

(60) Provisional application No. 62/330,611, filed on May 2, 2016.

(51) Int. Cl.
*H04L 29/08* (2006.01)
*H04W 4/029* (2018.01)
*H04W 4/80* (2018.01)
*G06F 16/29* (2019.01)

(58) Field of Classification Search
USPC .............. 455/456.1, 456.5, 456.6, 41.1, 41.2
See application file for complete search history.

(56) References Cited

U.S. PATENT DOCUMENTS

| | | |
|---|---|---|
| 8,483,711 B1 | 7/2013 | Mendis |
| 8,606,294 B2 | 12/2013 | Alizadeh-Shabdiz |
| 8,630,664 B2 | 1/2014 | Alizadeh-Shabdiz et al. |
| 8,644,852 B2 | 2/2014 | Jones et al. |
| 8,890,746 B2 | 11/2014 | Alizadeh-Shabdiz et al. |
| 9,031,580 B2 | 5/2015 | Alizadeh-Shabdiz |
| 9,271,121 B1 | 2/2016 | McDonnell et al. |
| 9,298,897 B2 | 3/2016 | Broadstone et al. |
| 9,369,845 B2 | 6/2016 | Alizadeh-Shabdiz et al. |
| 9,726,746 B2 | 8/2017 | Said |
| 2014/0009339 A1 | 1/2014 | Sutton et al. |
| 2014/0057589 A1 | 2/2014 | Velusamy et al. |
| 2015/0051975 A1 | 2/2015 | Kadous et al. |
| 2015/0186958 A1 | 7/2015 | Jackson |
| 2016/0323706 A1 | 11/2016 | Splaine et al. |
| 2016/0330601 A1 | 11/2016 | Srivastava |
| 2017/0318418 A1 | 11/2017 | Alizadeh-Shabdiz et al. |

TECHNIQUES FOR ESTABLISHING AND USING ASSOCIATIONS BETWEEN LOCATION PROFILES AND BEACON PROFILES

RELATED APPLICATIONS

This application is a continuation of U.S. patent application Ser. No. 15/220,156, titled "Techniques for Establishing and Using Associations Between Location Profiles and Ambient Profiles", filed Jul. 26, 2016, now issued as U.S. Pat. No. 9,936,348, which claims the benefit of U.S. Provisional Patent Application No. 62/330,611, titled "Techniques for Establishing and Using Associations Between Location Profiles and Ambient Profiles," filed May 2, 2016, the contents of both of which are incorporated by reference herein in their entirety.

BACKGROUND

Technical Field

The present disclosure relates generally to location-based services, and more specifically to techniques for establishing and using associations between location profiles and ambient profiles, and more even specifically to techniques for establishing and using associations between location profiles and beacon profiles.

Background Information

Location-based services are becoming increasingly important to businesses and consumers. Often, to provide location-based services, a positioning system determines a geographic location of a mobile device by comparing information in wireless signals observed by the mobile device to a database of information concerning known beacons. The determined geographic location may then be used to access information describing venues, parcels or buildings maintained in a separate database. Such an arrangement may have a number of shortcomings. For example, it may require that a geographic location be determined by a mobile device before any information concerning venues, parcels or buildings nearby the mobile device may be accessed. Further, it may prevent insights learned from the type of information from being used to update, correct or expand the other type of information (e.g., information learned about beacons being used to update, correct or expand information about venues, locations or buildings, or vice versa.) Accordingly, there is a need for improved techniques that can address these and/or other shortcomings.

SUMMARY

A location information management application implements techniques to establish and use semantic associations between location profiles (e.g., venue profiles, parcel profiles, building profiles, etc.) and ambient profiles, which may take the form of beacon profiles and/or sensor profiles. The semantic associations between location profiles and ambient profiles may be maintained independent of geographic location. Among other advantages, this may permit the retrieval of location profiles and the return of information to a mobile device independent of any determination of a specific geographic location of the mobile device that may, or may not, occur. Likewise, this may permit the update, correction or expansion of information in location profiles based upon information in associated ambient profiles, and the update, correction or expansion of information in ambient profiles based upon information in associated location profiles.

In one example embodiment, a location information management application executing on one or more computers selects one or more location profiles from a location database. The location information management application selects a first plurality of ambient profiles from a reference database, where the ambient profiles include beacon profiles for beacons that are located within a first area surrounding one or more geographic locations of the location profiles or sensor profiles for sensor readings captured by sensors of mobile devices within the first area surrounding one or more geographic locations of the location profiles. The location information management application extracts one or more patterns from the first plurality of ambient profiles and uses them to generate associations between location profiles and ambient profiles in an association database which semantically associates location profiles with ambient profiles independent of geographic location. In some implementations, the location information management application also selects a second plurality of ambient profiles from the reference database that operate as a control group. One or more patterns are extracted from the first plurality of ambient profiles. In some implementations the extracted patterns are treated as potential patterns, and one or more generic patterns are extracted from the second plurality of ambient profiles. Any of the one or more generic patterns that occur in the potential patterns are removed to produce a set of remaining patterns. An association between location profiles and ambient profiles is formed in THE association database based on the patterns/remaining patterns.

The information in the association database may be used in various manners. In one implementation, the location information management application may receive a request from a mobile device that includes identity information for one or more beacons whose wireless signals were observed by the mobile device or sensor readings of sensors of the mobile device. The association database is accessed to determine one or more locations profiles corresponding to ambient profiles related thereto, and a location is returned. In another implementation, the location information management application may receive a request from a mobile device that includes a determined geographic location of the mobile device. Information from the association database is accessed to produce a tile is related to the geographic location, and the tile is returned. In still another implementation, the associations between the ambient profiles and the location profiles may be used to propagate information there between, for example, updating one or more ambient profiles based on information in one or more location profiles, or vice versa.

It should be understood that the example embodiment discussed in this Summary may include a variety of other features, including other features discussed below, and variations thereof. Further a variety of other embodiments may be utilized involving various combinations of the features discussed below and variations thereof. This Summary is intended simply as a brief introduction to the reader, and does not imply that the specific features mentioned herein are all the features of the invention, or are essential features of the invention.

BRIEF DESCRIPTION OF THE DRAWINGS

The description below refers to the accompanying drawings, of which.

DETAILED DESCRIPTION

Definitions

Figure 1:
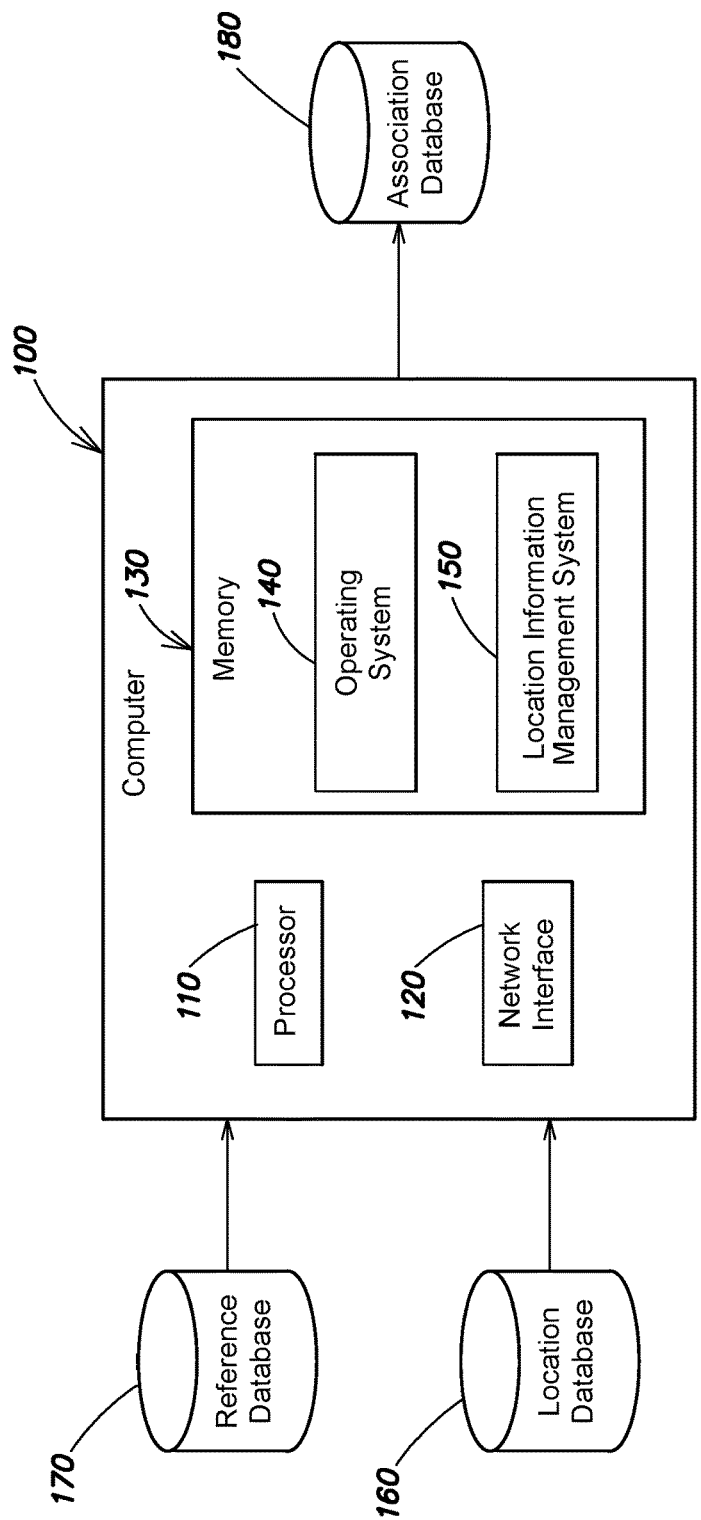
FIG. 1 is a block diagram of an example computer that may interoperate with mobile devises to implement the presently described techniques.

As used herein, the term "mobile device" refers to an electronic device adapted to be transported. Examples of mobile devices include smartphones, tablet computers, and smartwatches, among other readily transportable electronic devices.

As used herein, the term "beacon" refers to a wireless module that can be identified uniquely. A beacon emits wireless signals (e.g., radio waves) and beacon information can be derived from the detection of these wireless signals. A beacon can have a fixed geographic location, or can be mobile. The beacon information may be extracted directly from the wireless signals, or determined after processing of the wireless signals (e.g., involving communication with a positioning system separate from the beacon). Examples of beacons include Wi-Fi APs, Bluetooth Low Energy (BLE) devices (Android® beacons, iBeacon® beacons, etc.), cellular base stations, and the like.

As used herein, the term "location" refers to a venue, a parcel or a building (or part thereof). Typically, a location covers some physical area, and therefore has a physical size. The term "location" should be understood to have a different meaning than the term "geographic location" which, as used herein, refers to a physical point on the Earth. A geographic location may be either precisely known or estimated by a positioning system.

As used herein, the term "venue" refers to a place with a semantically describable identity and a definable geography. Examples of venues include retail stores, restaurants, museums, etc. that encompass an entire building, part of a building, multiple buildings, outdoor space or other area. A venue may be an individual place or part of a venue chain of commonly owned or operated venues (e.g., a chain of retail stores). The geographic location of a venue (or of all venues in a venue chain) may not always be known. A venue may include one or more other venues (e.g., sub-venues) that encompass a part of their area.

As used herein term, the term "parcel" refers to a geometrically delineated unit of land. Typically, a parcel will have a legal title (i.e. is owned with specific rights). Examples of parcels include the property of a residential building, a commercial building, or a vacant lot.

As used herein, the term "location profile" refers to a set of information or metadata related to a location, i.e., a venue, a parcel or a building (or part thereof). Examples of information included in a location profile include identity information (in the case of a venue: e.g., venue name, venue address, etc.), type information (e.g., in the case of a venue: e.g., venue type, venue owner, etc.), and geographic location information. Geographic location in a location profile may be defined relative to a global reference system (e.g., the World Geodetic System 1984 (WGS84) coordinate system) or relative to a local reference point (e.g., a reference to a main entrance of a mall, or a corner of a building, etc.).

As used herein, the term "beacon profile" refers to a set of beacon information or attributes related to a beacon. Beacon profiles may be constructed by a wireless positioning system by crowd sourcing observations of wireless signals received by mobile devices operated by end users and moved randomly through the environment, can be collected by dedicated scanning units (e.g., vehicles) that follow programmatically defined routes, or by other techniques. Examples of beacon information included in a beacon profile include identify information (e.g., in the case of a Wi-Fi access point: media access control (MAC) address, service set identifier (SSID), or other identifier), type information (e.g., in the case of a Wi-Fi AP: type of the AP, manufacturer of the AP, etc.), configuration information, and geographic location information, among others.

As used herein, the term "sensor profile" refers to a set of sensor information describing observable conditions. Sensor information may include information about light, magnetic field, pressure, sound, received signal strength of various wireless signals (e.g., Wi-Fi, BLE, cellular, etc.), or information about other types of observable conditions. A sensor profile may include geographic location information related to the sensor information.

As used herein, the term "ambient profile" refers to at least one of a beacon profile or a sensor profile. For example, an ambient profile may include a set of beacon information or attributes related to a beacon, a set of sensor information describing observable conditions, or a combination of both beacon information or attributes related to a beacon and sensor information describing observable conditions.

As used herein, the term "generic pattern" refers to a pattern that exists independent of locations (e.g., independent of particular venues, parcels or buildings), such that there is no correlation between the pattern and locations. A generic pattern may be ubiquitous, or at least highly prevalent, in a geographical region. Examples of a generic pattern include frequently-used identifiers (e.g., default SSIDs preconfigured into Wi-Fi APs that are not often changed), frequently-seen device types (e.g., of manufactures having substantial market share), and frequently-observed sensor reading, among others.

As used herein, the term "tile" refers to a set of information in a geographically bounded portion of a reference database. For example, a tile may include all or part of the information for ambient profiles (e.g., beacon profiles or sensor profiles) that falls within the bounded portion.

Example Embodiments

FIG. 1 is a block diagram of an example computer 100 that may interoperate with mobile devises to implement the presently described techniques. The computer 100 includes a processor 110, a network interface 120, and a memory 130 that stores software (i.e., machine-executable instructions) and data. The software may include an operating system 140 and a location information management application 150. The location information management application 150 accesses a location database 160 (e.g., a venue database, a parcel database, a building database, etc.) that stores location profiles (e.g., venue profiles, parcel profiles, building profiles, etc.), and a reference database 170 that stores ambient profiles (e.g., beacon profiles and/or sensor profiles), which are maintained on the computer 100, one or more other computers (not shown), or at least in part on one or more mobile devices (not shown).

The location database 160 may be constructed by a location data system (not shown) that aggregates and processes location information (e.g., information about venues, parcels, buildings, etc.). In some embodiments, location information may have been collected by an automatic detection system. In other cases, the location data may have been sourced from public and/or private databases. The reference database 170 may be constructed by a wireless positioning system (not shown) that aggregates and processes ambient information. The ambient information may take the form of beacon information detected by scanning devices (e.g., end user mobile devices that are moved randomly by users and/or dedicated scanning devices that follow pre-planned paths). For example, the reference database 170 may be constructed by a Wi-Fi positioning systems (WPS) that aggregates and processes beacon information describing Wi-Fi signals received from Wi-Fi APs, a BLE positioning systems the aggregates and processes beacon information describing BLE signals received from nearby BLE devices (e.g., Android® beacons, iBeacon® beacons, etc.), and/or a cellular positioning system that aggregates beacon information regarding cellular base station. Alternatively, the ambient information may take the form of sensor information. The reference database 170 may by constructed by a sensor data system (not shown) that aggregates and processes sensor readings obtained by devices (e.g., end user mobile devices or dedicated scanning devices). For example, many devices include multiple sensors e.g., an accelerometer, gyroscope, global positioning system (GPS) receiver, light sensors, radio modules (e.g., Wi-Fi modules, BLE modules, cellular modules), etc., and the sensor data system may determine a sensor profile for a particular geographic location by aggregating sensor values of devices that travel to that geographic location.

The location information management application 150 builds and subsequently accesses an association database 180 that maintains semantic associations between location profiles (e.g., venue profiles, parcel profiles, building profiles, etc.) and ambient profiles. The association database 180 may be maintained on the computer 100, another computer (not shown), or at least in part on one or more mobile devices (not shown). Preferably, the location information management application 150 will determine each ambient profile that should be associated with only one location profile, but practically the location information management application 150 may determine there are associations with multiple location profiles (e.g., due to error, overlap of locations, or other conditions). In some cases, the entire location profile and ambient profile may be maintained as part of the association database 180. Alternatively, only portions of the ambient profiles may be maintained. For example, in some cases, ambient profiles associated with the same location profile may be aggregated or collapsed to a smaller data set that is maintained.

Figure 2:
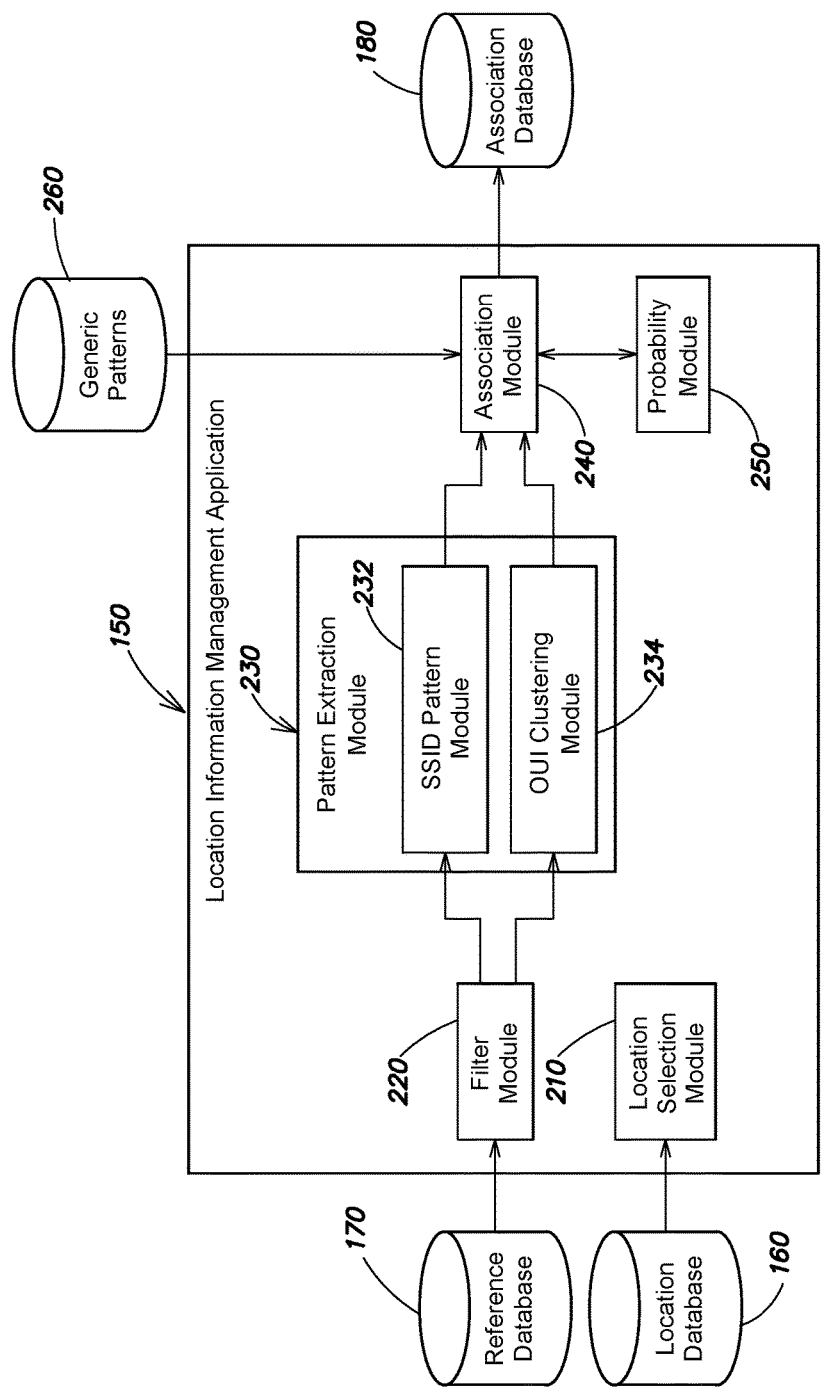
FIG. 2 is a block diagram of an example software architecture that may be employed by a location information management application to establish semantic associations between location profiles and beacon profiles (or sensor profiles)

FIG. 2 is a block diagram of an example software architecture that may be employed by a location information management application 150 to establish semantic associations between location profiles and ambient profiles. A location selection module 210 is configured to select one or more location profiles (e.g., one or more venue profiles, parcel profiles, building profiles, etc.). The location profiles may be selected based on their sharing common information, as discussed in more detail below. A filter module 220 is configured to select a first set of ambient profiles whose geographic locations are within a first area surrounding one or more geographic locations of the location profiles. The first set of ambient profiles typically will be those most relevant to the location profiles. In some embodiments, the filter module 220 may also select a second set of ambient profiles to be used as a control group. The filter module 220 may be configured to provide the sets of ambient profiles to a pattern extraction module 230.

The pattern extraction module 230 is configured to extract one or more patterns from the first set of ambient profiles. In some embodiments, the pattern extraction module 230 is also configured to extract one or more patterns from the second set of ambient profiles. As described in more detail below, in the case of the ambient profiles being beacon profiles, the patterns may be, for example, strings of characters in an identifier included in beacon profiles, a type of beacon indicated in the beacon profiles. In a specific implementation where the beacon profiles represent Wi-Fi APs, the pattern extraction module 230 may include an SSID pattern module 232 that is configured to look for an SSID pattern consisting of a string of characters that are shared among the SSIDs of the Wi-Fi APs of the sets, and an organizationally unique identifier (OUI) clustering module 234 that is configured to look for OUIs that are shared among the MAC addresses of Wi-Fi APs of the sets. Alternatively, in the case of the ambient profiles being beacon profiles, the patterns may be, for example, a set of sensor readings indicated in sensor profiles, or other common information that is useful in forming generalizations about sensor reading related to a location (e.g., a venue, parcel, building, etc.).

The pattern extraction module 230 may operate independently, or in some alternative implementations receive and utilize explicit or implicit feedback from a mobile device or beacon that indicates quality of a pattern, a preferred pattern, or other information usable by the pattern extraction module 230. The pattern extraction module 230 is configured to provide the location profiles, sets of ambient profiles and patterns to an association module 240, which uses the information to build or update an association database 180. For example, the association module may treat the patterns from the first set of ambient profiles as potential patterns, and the patterns from the second set of ambient profiles as generic patterns. Generic patterns exist independent of locations (e.g., independent of venues or parcels) and thereby their presence in ambient profiles does not indicate that there is any correlation between those profiles and location profiles. In some implementations, generic patterns may be stored in a generic pattern database 260, so that they do not need to be regenerated each time new sets of ambient profiles are evaluated. The pattern extraction module 230 may check potential patterns against the generic patterns, and eliminate any generic patterns from the potential patterns.

The association module 240 may, together with a probability module 250, take the potential patterns, calculate a probability of association (i.e. a measure of strength of the associative relationship) between the underlying one or more location profiles and set of ambient profiles based on the potential patterns, and eliminate certain patterns to produce a set of remaining patterns that have a probability of association that exceeds a predetermined threshold, and then build or update the association database 180 to include associations between the location profiles and ambient profiles that exhibit the remaining patterns. The location profiles and ambient profiles may be directly associated, independent of geographic location (i.e. geographic location need not be determined or referenced to access a location profile from an ambient profile or pattern, or vice versa).

Figure 3:
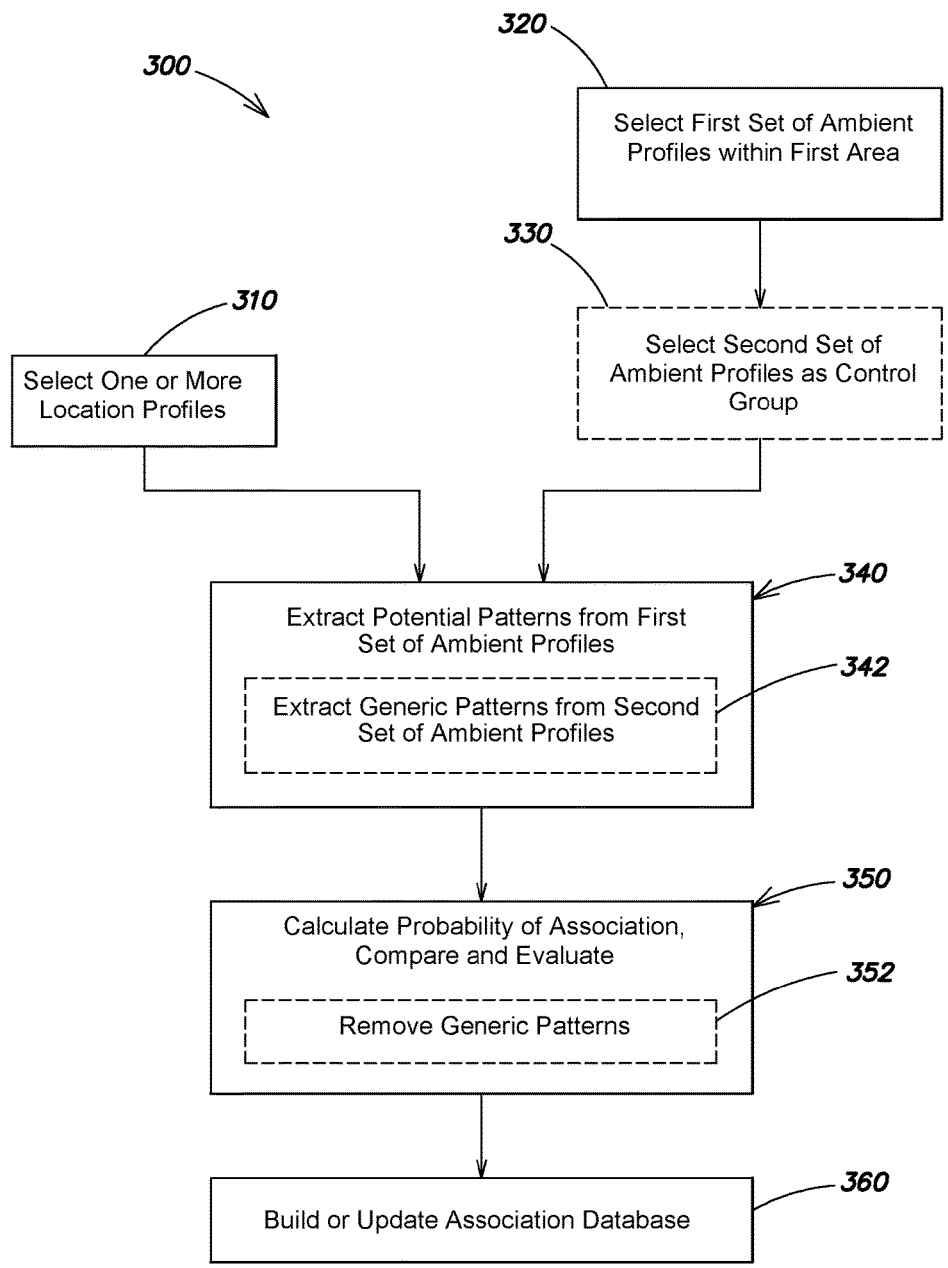
FIG. 3 is a flow diagram of an example sequence of steps that may be executed by a location information management application to establish semantic associations between location profiles and beacon profiles (or sensor profiles)

FIG. 3 is a flow diagram of an example sequence of steps 300 that may be executed by a location information management application 150 to establish semantic associations between location profiles and ambient profiles. At step 310, the location information management application 150 selects one or more location profiles (e.g., one or more venue profiles, parcel profiles, building profiles, etc.). Locations profiles may be grouped and selected collectively based on a variety of types of common information in the location profiles, looking to factors related to identity, type, geographic location, and the like. For example, in the case of venues, venue profiles of a venue chain (e.g., a retail store chain) may be grouped together based on their common ownership and collectively selected. Likewise, venue profiles of individual venues (e.g., individual retail stores) whose geographic locations coincide with the same parcel or building (e.g., a shopping center) may be grouped together and selected collectively. Similarly, parcel profiles of individual parcels (e.g., individual properties) that share common management (e.g., are managed by a same property manager) may be grouped together and selected collectively. A wide variety of other criteria may be used to group and collectivity select related location profiles.

At step 320, the filter module 220 of the location information management application 150 selects a first set of ambient profiles that are most relevant to the location profiles. The selection may be based on comparison to selected information from the location profiles. For example, in the case where the ambient profiles are beacon profiles, the selection be based on comparison of the geographic location of the related beacons to a first area surrounding one or more geographic locations of the location profiles. The first area may be defined by a radius about a geographic location of each selected location profile. For example, if a single venue profile was selected, the area may be defined by a radius about the geographic location of that venue. Alternatively, if venue profiles of a venue chain were selected, the first area may be defined by a radius about the geographic locations of each venue in the venue chain, the first area being the sum of such areas. Further, if a parcel profile or multiple parcel profiles were selected, the first area may be defined by a radius about the geographic locations of each parcel. The radius may be of a fixed size (e.g., 350 meters (m)) or based on a type or size of the location (e.g., venue, parcel, building, etc.). For example, for a venue profile the radius may be directly proportional to a size of the venue, such that larger venues have larger radii.

At optional step 330, the filter module 220 of the location information management application 150 selects a second set of ambient profiles that are used as a control group. The selection may be based on one or more covariants. In the general, any information about the first set of ambient profiles can be used as a covariate for selection of the second set of ambient profiles. For example, in one implementation the selection may be based upon geographic location, e.g., to include locations that are adjacent to but not in the first area in which the first set of ambient profiles are contained or the entire world not including the first area. For example, in the case where the ambient profiles are beacon profiles, the selection may be based on the geographic location of the related beacons being within a second area (e.g., that excludes the first area. The outer extent of the second area may be defined based on various geographical region boundaries, e.g., a town, a country, a state, the world, etc. As discussed further below, a variety of other covariants may also be used in selecting the second set of ambient profiles.

At step 340, the pattern extraction module 230 of the location information management application 150 extracts one or more potential patterns from the first set of ambient profiles. In the case where the ambient profiles are beacon profiles, patterns may be common strings of characters (e.g., an n-gram) in an identifier included in the beacon profiles. When beacons are deployed at locations (e.g., venues, parcels, buildings, etc.) by an organization, a typical practice is to use regular naming schemes in the identifiers assigned to them. For example, in the case of Wi-Fi APs and venue chains (e.g., retail store chains), the organization (e.g., company) that controls the venue chain may configure all Wi-Fi APs of the venue chain to include a common character string (e.g., the same SSID or SSIDs that share a common prefix or suffix portion). Observing a common strings of characters in SSIDs of Wi-Fi APs nearby known geographic locations of venues (e.g., retail stores) of a venue chain (e.g., a retail store chain) may be considered an indicator that those Wi-Fi APs are operated by the venue chain. Further, detecting the strings of characters in SSIDs in a cluster of other Wi-Fi APs that are not nearby any known venue of the venue chain may be considered an indicator that the venue chain has opened a new venue (e.g., a new retail store) or a venue has moved (e.g., a store relocation).

Further, patterns may be types of beacons indicated in beacon profiles. When beacons are deployed at locations (e.g., venues, parcels, buildings, etc.) a typical practice is to use beacons by a same type, for example, beacons made by a same manufacture. Manufacturer of a beacon may be identified in various ways. One way to identify the manufacturer of a beacon is to look to a specific portion of an identifier that is dedicated to identifying manufacture. For example, in the case of Wi-Fi APs, the OUI of MAC addresses may be examined. Observing a common OUI for Wi-Fi APs nearby known geographic locations of venues (e.g., retail stores) of a venue chain (e.g., a retail store chain) may be a considered an indicator that those Wi-Fi APs are operated by the venue chain. Further, detecting the OUI for Wi-Fi APs in a cluster of other Wi-Fi APs, that are not nearby any known venue of the venue chain, may be considered an indicator that the venue chain has opened a new venue (e.g., a new retail store) or a venue has moved (e.g., a store relocation).

Further, in a case where the ambient profiles are sensor profiles, patterns may be sets of sensor readings indicated in sensor profiles. Related locations (e.g., venues, parcels, buildings, etc.) often have similar environmental conditions (e.g., similar light levels, sounds levels, received signal strengths, etc.). Common environmental conditions may therefore be used as indicators of relation. For example, in the case of a venue chain (e.g., a retail store chain), observing similar sensor readings nearby known geographic locations of venues (e.g., retail stores) may be a considered an indicator that those sensor readings are correlated to the venue chain. Further, detecting those sensor readings at a geographic location that is not nearby any known venue of the venue chain may be considered an indicator that the venue chain has opened a new venue (e.g., a new retail store) or a venue has moved (e.g., a store relocation).

At optional sub-step 342, the pattern extraction module 230 also extracts one or more generic patterns from the second set of ambient profiles that operates as a control group. Certain types of information may be prevalent among many ambient profiles, including those beyond the first set of ambient profiles. Accordingly, observing such information in common among beacons in the vicinity of locations (e.g., venues, parcels, buildings, etc.) is not a strong indicator that such information is correlated to the locations. For example, in the case of Wi-Fi APs, a default SSID may be widely used. Therefore, observing the default SSID in the vicinity of locations (e.g., venues, parcels, buildings, etc.) is not a strong indicator of a correlation to those locations, and the string of characters representing the default SSID may be considered a generic pattern. Likewise, a large percentage of Wi-Fi APs in a geographical region may be manufactured by the same company. Accordingly, observing the OUI of that company in the MAC address of beacons in the vicinity of locations (e.g., venues, parcels, buildings, etc.) is not a strong indicator of a correlation to those locations, and the OUI may be considered a generic pattern. Generic patterns may be stored for repeated use, or extracted on demand for each set of potential patterns.

At step 350, the probability module 250 of the location information management application 150, calculates a probability of association between one or more location profiles and ambient profiles of first set of ambient profiles that exhibit the potential patterns, compares the probability of association to a predetermined threshold (e.g., 0.7), and produces a set of associations that have a probability of association that exceeds the predetermined threshold. Probability of association may be calculated based on proximity of beacons that exhibit the pattern to the geographic location of the locations (e.g., venues, parcels, etc.), distinctiveness of the pattern (e.g., number of characters in a character string), number of concurrent patterns, size of a geographical region in which the pattern is found (e.g., throughout a city, state, country, etc.), or other criteria. As part of step 350, at optional sub-step 352, generic patterns may be removed from the potential patterns. Generic patterns may be removed before considering the probability of association for those patterns, or as part of considering the probability of association (e.g., by lowering the probability by an amount based on the patterns being potentially generic patterns).

At step 360, the association module 240 of the location information management application 150 builds or updates the association database 180, to maintain semantic associations between the one or more location profiles and the ambient profiles of the first set of ambient profiles based on the retained patterns. The associations may be formed independent of geographic location (i.e. geographic location, while potentially included in the association database, need not be referenced to access a location profile from an ambient profile, or vice versa.) In some embodiments, the probability of association may be stored (e.g., as a number) in the association database 180 together with the associations.

Figure 4:
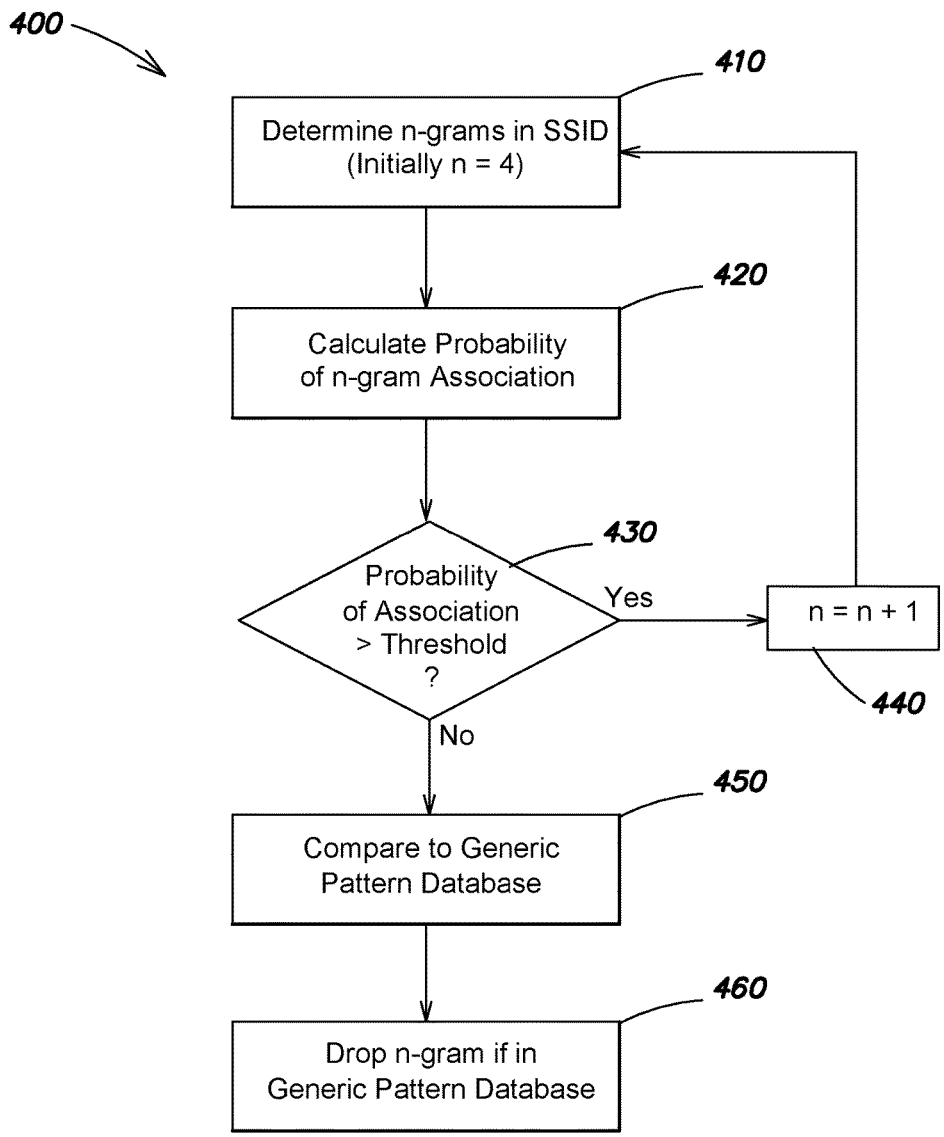
FIG. 4 is a flow diagram of a sequence of steps of an example pattern extraction and evaluation algorithm that may be implemented as part of FIG. 3 for a case of ambient profiles being beacon profiles, beacons being Wi-Fi access points (APs) and locations being venues (e.g., of a venue chain, such as a retail store chain)

FIG. 4 is a flow diagram of a sequence of steps 400 of an example pattern extraction and evaluation algorithm that may be implemented as part of steps 340-350 of FIG. 3, for a case of ambient profiles being beacon profiles, beacons being Wi-Fi APs and locations being venues (e.g., of a venue chain). At step 410, the pattern extraction module 230 determine n-grams in the SSID of the first set of beacon profiles for the Wi-Fi APs within a first area surrounding geographic locations of selected venues. The length of the n-gram may be initially set to a predefined value (e.g., 4 characters, such that the n-gram is initially a 4-gram). At step 420, the probability module 250, calculates a probability of association of beacon profiles with the selected venues for each n-gram. At step 430, the association module 240 compares the probability of association for each n-gram with a predetermined threshold (e.g., 0.7), and retains only those n-grams that meet the threshold. For each n-gram that is retained, a check is performed whether the n-gram is part of a larger n-gram. To perform the check, execution proceeds to step 440 where the association module increments the length (e.g., to next evaluate 5-grams that include the 4-gram), and then steps 410-430 are repeated. If a larger n-gram is found that yields a probability of association that exceeds the predetermined threshold, it replaces the smaller n-gram. Eventually, when a final list of n-grams is accumulated, at step 450, the association module 240 compares it against n-grams from the generic pattern database 260, that may have been previously determined using steps similar to steps 410-440. At step 460, the association module 240 drops any n-gram that corresponds to an n-gram from the generic pattern database 260, to prevent associations from being formed based on generic patterns.

Figure 5:
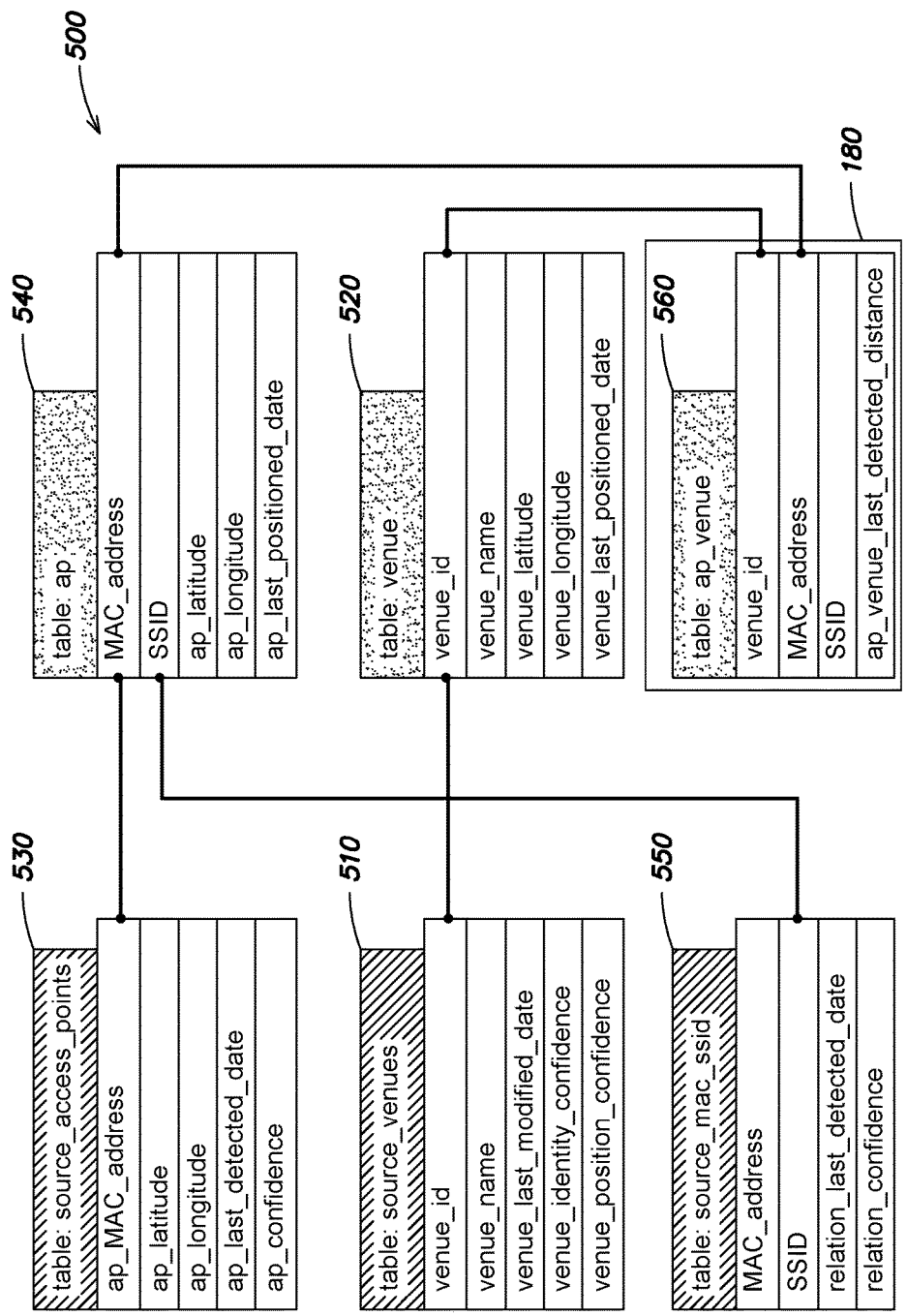
FIG. 5 is an example schema illustrating information associated with an example association database, for a case of ambient profiles being beacon profiles, beacons being Wi-Fi APs and locations being venues (e.g., of a venue chain, such as a retail store chain)

FIG. 5 is an example schema 500 illustrating information associated with an example association database 180, for a case of ambient profiles being beacon profiles, beacons being Wi-Fi APs and locations being venues (e.g., of a venue chain, such as a retail store chain). The schema 500 includes a source venues table 510 that includes information characterizing individual venues (e.g., venue ID, venue name, date of a most recent modification, and confidence measures for the venue identity and geographic location), which references a venues table 520 that include further information (e.g., venue ID, a venue name, geographic location as latitude and longitude, and date of a most recent location determination). The example schema 500 also includes a source AP table 530 that includes information characterizing individual APs (e.g., MAC address, geographic location as latitude and longitude, date of most recent detection of the AP, and a confidence measure for the geographic location), which references an AP table 540 that includes further information (e.g., MAC address, SSID, geographic location as latitude and longitude, and date of a most recent location determination). A source MAC-SSID association table 550 maintains an association between MAC address and SSID for Wi-Fi APs (e.g., including MAC address, SSID, a date of most recent MAC-SSID association, and a MAC-SSID association confidence). Finally, the association database

180 may take the form of an AP-Venue association table 560 that maintains associations between venues and Wi-Fi APs. The associations may be maintained, for example, as a direct relation between venue ID and MAC address/SSID of Wi-Fi APs (e.g., including in the AP-Venue association table 560, venue ID, MAC address, SSID, and an indication of distance between Wi-Fi AP and the venue).

Figure 6:
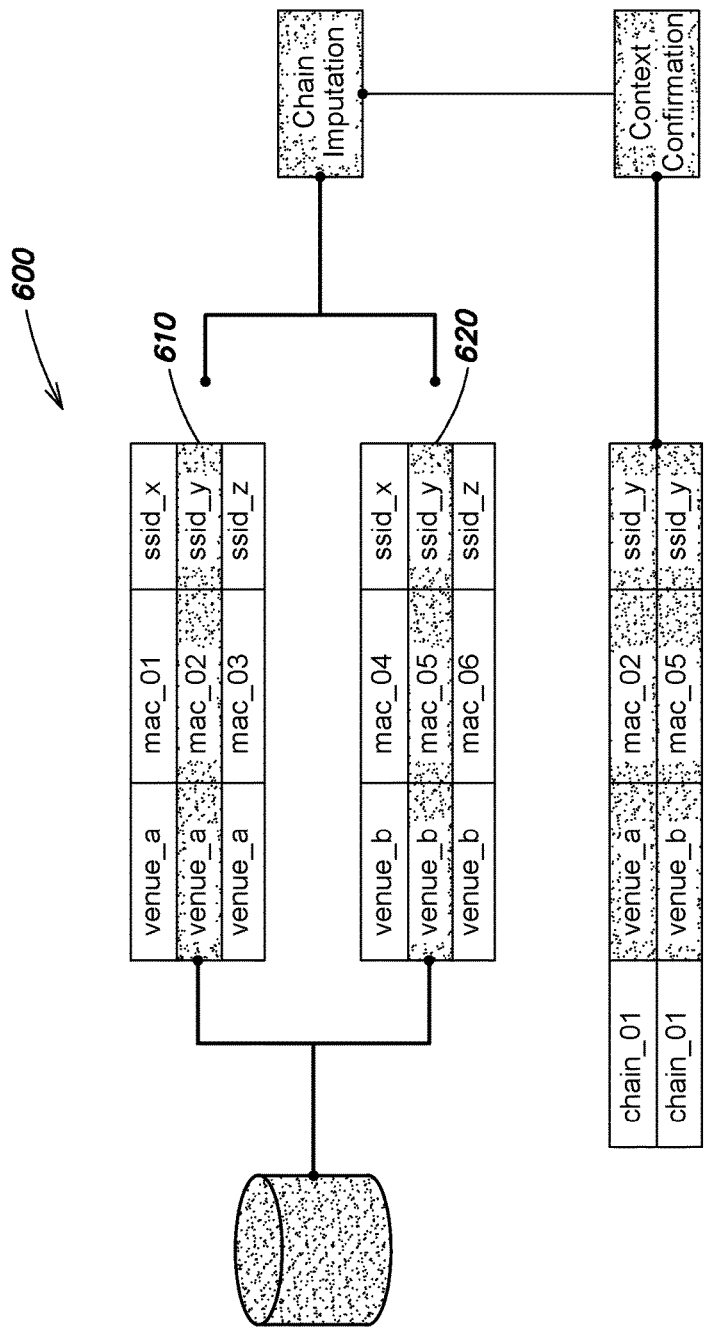
FIG. 6 is an example of extracting patterns, for a case of ambient profiles being beacon profiles, beacons being Wi-Fi APs and locations being venues of a venue chain, such as a retail store chain.

FIG. 6 is an example 600 of extracting patterns, for a case of ambient profiles being beacon profiles, beacons being Wi-Fi APs and locations being venues of a venue chain, such as a retail store chain. The pattern extraction module 230 may extract common strings of characters from the SSID and MAC address for venues (referred to as "venue_a" and "venue_b") that are known to be part of a venue chain (referred to as "chain_01"). For example, the pattern extraction module 230 may examine rows 610 and 620 and extract a common SSID and a common OUI of the MAC addresses. After evaluating the probability of association together with context information, and checking this pattern against generic patterns as described above, the association module 240 may store the pattern for further use in forming associations.

The association database 180 may be utilized in a variety of manners. In some embodiments, the association database may be used to return information from one or more location profiles to a mobile device. Such operations may occur contemporaneous to the mobile device observing beacons or collecting sensor reading, or in an "offline" mode, where the mobile device stores information that is processed at a later time.

Figure 7:
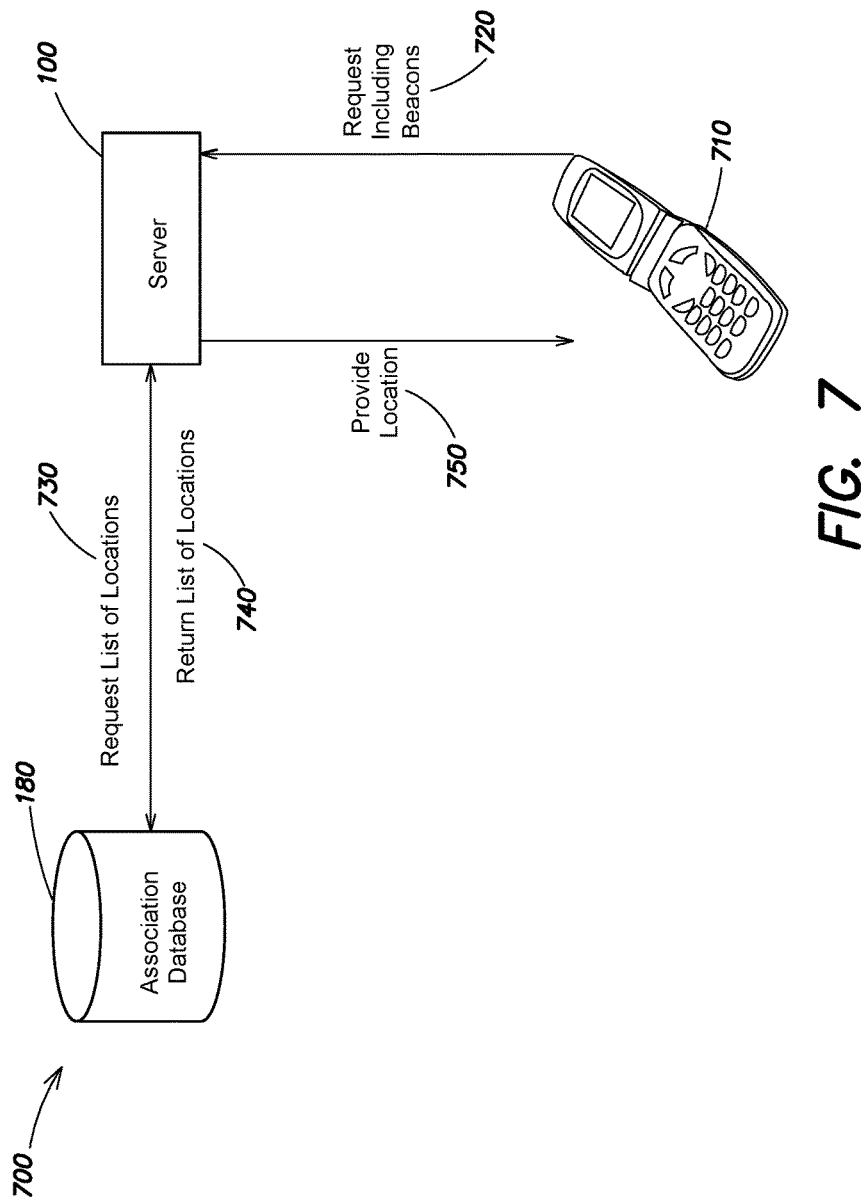
FIG. 7 is a diagram of an example message exchange that may be conducted between a mobile device, a computers and an association database (that may be part of the computer or separate), to determine locations (e.g., venues, parcels, buildings, etc.) visited by the mobile device.

FIG. 7 is a diagram of an example message exchange 700 that may be conducted between a mobile device 710, a computer 100 and an association database 180 (that may be part of the computer 100 or separate), to determine locations (e.g., venues, parcels, buildings. etc.) visited by the mobile device. The mobile device 710 sends a request 720 including identity information for one or more beacons (e.g., in the case of Wi-Fi APs, MAC address, SSID, etc.) whose wireless signals were observed by the mobile device 710 or includes sensor readings of sensors of the mobile device 710. In response to the request from the mobile device 710, the location information management application 150 on the computer 100 accesses the association database 180 and requests 730 one or more location profiles that are associated with ambient profiles for the detected beacons or sensor readings. The association database 180 returns 740 a list of locations (e.g., venues, parcels, building, etc.) from the associated location profiles. The location information management application 150 on the computer 100 may select a most probable location, and provides 750 that location in a response message to the mobile device 710.

Figure 8:
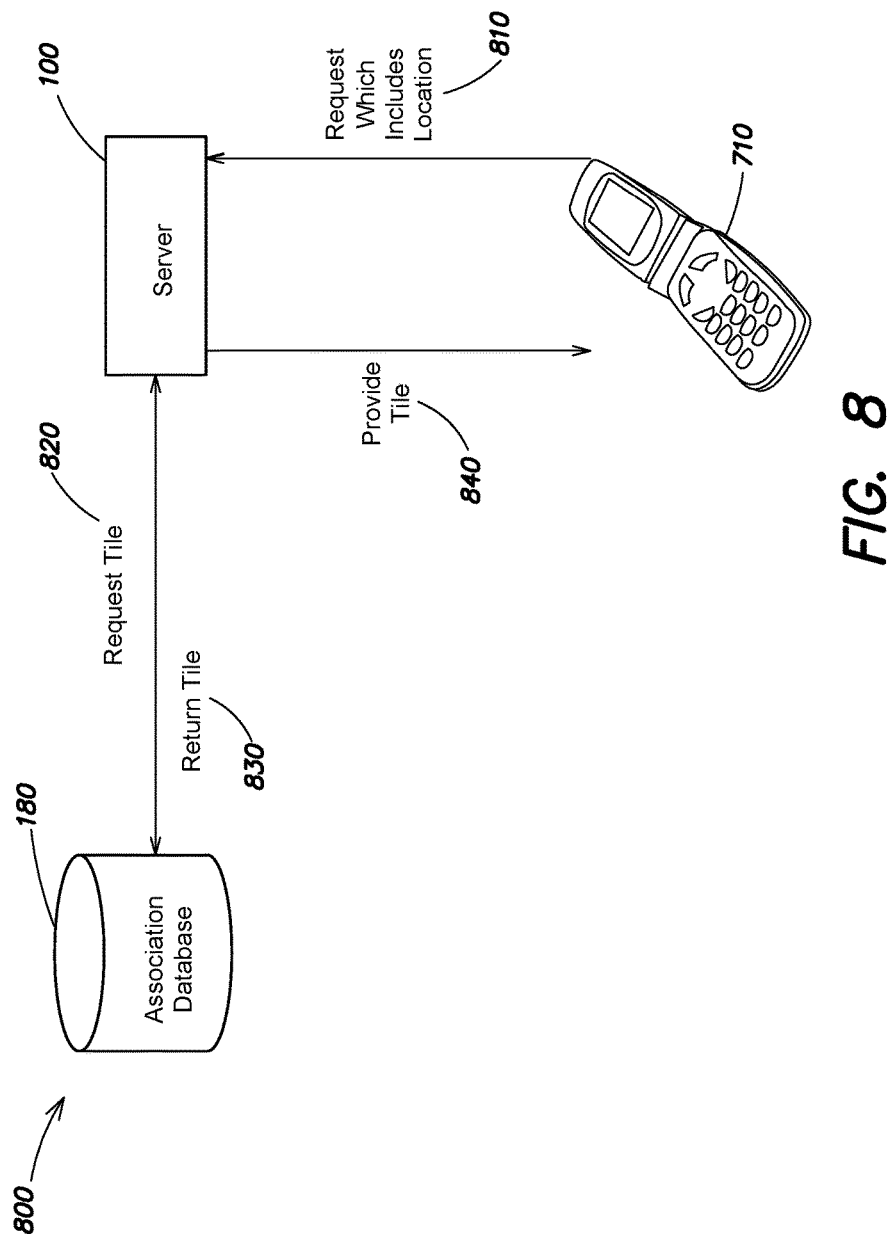
FIG. 8 is a diagram of an example message exchange that may be conducted between a mobile device, a computer and an association database (that may be part of the computer or separate), to determine locations (e.g., venues, parcels, buildings, etc.) visited by the mobile device and return tiles associated with those locations.

The return of locations to the mobile device may be combined with location determination. FIG. 8 is a diagram of an example message exchange 800 that may be conducted between a mobile device 710, a computer 100 and an association database 180 (that may be part of the computer or separate), to determine locations (e.g., venues, parcels, buildings, etc.) visited by the mobile device and return tiles associated with those locations. The mobile device 710 sends a request 810 including a determined geographic location of the mobile device 710. In response to the request from the mobile device 710, the location information management application 150 on the computer 100 accesses the association database 180 and requests 820 a location tile that is related to the geographic location. The association database 180 returns 830 a location tile. The location information management application 150 on the computer 100 may provide 840 the location tile in a response message to the mobile device 710.

The return of information from one or more location profiles from the association database 180 to a mobile device may be used in a number of different manners. For example, in one implementation, historically observed beacon information or sensor readings may be saved on a mobile device, and sent to the computer 100 on a periodic basis, and used in conjunction with the association database 180 to produce a list of previously visited locations (e.g., venues, parcels, buildings, etc.). Likewise, in another implementation, a record of beacons the mobile device 710 connected to may be maintained on the mobile device, and sent to the computer 100 on a periodic basis along with information regarding observed beacons or sensor readings, and used in conjunction with the association database 180 to produce a list of places of interest. A user of the mobile device 710 both visiting a location (e.g., a venue, parcel, building, etc.) and connecting to a beacon while at the location may indicate that the location is an important place to the user. Such technique may be utilized to determine places such as the users home, work, school, close friends, close relatives, etc. Further, in another implementation, the determination of a location (e.g., a venue, parcel, building, etc.) using the association database 180 may enable geo-fencing, or geo-fencing-like functionality. A mobile device 710 may be considered to be "inside" or "outside" the area encompassed by a location indicated by the association database 180, to provide a geo-fencing-like boundary to which location-based services may be related. Further, a comparison between observed ambient information and stored ambient profiles associated with a location profile may be used to determine when the mobile device 710 is on the threshold of entering or exiting the area encompassed by a location. In a still further implementation, information from one or more location profiles of the association database 180 may be returned to an interested third party, rather than to the mobile device 710 itself. For example, in the case of an Enhanced 911 (E911) service, the third party may be emergency services, and the returned information may be a dispatchable address that provides contextual and location information to speed the deployment of aid to the location of the caller.

In further implementations, the associations of the association database 180 may be used to update, correct or expand ambient profiles and/or location profiles. In one implementation, a determination is made that one or more ambient profiles have moved in response to detecting that an associated location profile has moved. The geographic location maintained in the ambient beacon profiles may thereafter be updated based upon the associated location profile. In another implementation, a determination is made that a location profile has moved in response to detecting that one or more associated ambient profiles have moved. The geographic location maintained in the location profile may thereafter be updated based upon the one or more associated ambient profiles. In a further implementation, one or more attributes other than geographic location maintained in one or more ambient profiles may be prorogated to an associated location profile (e.g., to correct, update or add additional attributes to the associated location profile). For example, in one specific implementation, internal address information (e.g., floor number, room name, wing, etc.) associated with SSID attributes of beacon profiles may be propagated to associated location profiles. Similarly, in a still further implementation, one or more attributes other than geographic location maintained in a location profile may be propagated to one or more associated ambient profiles (e.g., to correct, update or add additional attributes to the one or more associated ambient profiles).

In still further implementations, patterns used to form the association database 180 may be used to expand the association database. For example, in one implementation, patterns may be applied to ambient profiles in the reference database 170 (e.g., that are located beyond the first area) to identify other beacons that should be associated with a location (e.g., a venue, parcel, a building) or a location chain (e.g., a venue chain). In a further implementation, patterns may be applied to ambient profiles in the reference database 170 (e.g., that are located beyond the first area) to identify one or more new locations. In yet another embodiment, patterns may be applied to ambient profiles in the reference database 170 that lack geographic locations. Upon identifying that beacons that should be associated with one or more locations based on the patterns, the association database 180 may be utilized to infer geographic locations for the beacons based on the associated location profiles.

Still further, in some implementations, ambient profiles may be collected by mobile devices employing various crowd sourcing techniques. As part of such techniques, a type of application executing on the mobile device may provide information that is incorporated into the ambient profiles. For example, if the application is a type of application typically used indoors, this knowledge may be incorporated into ambient profiles as a probability of being indoors. Such information may be utilized to accurately stratify a set of ambient profiles which lack location differentiation within a location profile.

In yet other implementations, ambient profiles may be associated with network information (e.g., IP address, network speed, network type, network protocol, network security, wireless network radio frequency, etc.). Through the associations in the association database 180, this network information may be propagated to location profiles.

Conclusion and Alternatives

In summary, the above description details techniques for establishing and using semantic associations between location profiles and ambient profiles (which may take the form of beacon profiles and/or sensor profiles) by a location information management application executing on one or more computers. It should be understood that the techniques and portions thereof may be utilized together, individually, or in combination with other techniques, depending on the implementation. Further, it should be understood that aspects of the techniques may be modified, added to, removed, or otherwise changed depending on the implementation.

For example, while it is discussed above that the second set of ambient profiles that operates as a control group may be selected based on covariants, and that one example is to select ambient profiles for the second set whose geographic locations fall within a second area, it should be understood that a wide variety of other covariants may alternatively (or additionally) be used in the selection. Any attributes maintained in the first set of ambient profiles may be used to select a second set of ambient profiles that shares such attributes and can operated as a control group. For example, attributes maintained in the first set of ambient profiles may be used to select ambient profiles associated with co-located venue chains or ambient profiles that have close-to-but-not-exactly-equal attributes. Such attribute-based selection techniques can be used to provide a seconds set of ambient profiles tailored for the exact first set of ambient profiles, rather than being general for all possible first sets of ambient profiles, such that the generic patterns generated therefrom are "profile specific". Further, association with another first sets of ambient profiles may be used as a selection criteria. For example, a group of ambient profiles associated with a venue chain A may be used as a control group for a venue chain B, in order to differentiate patterns chosen for venue chain B from those of venue chain A.

In addition to being profile specific, the second set of ambient profiles that operates as a control group may be "device specific", with the covariates based on a mobile device. For example, a mobile device history (including previously captured sensor profiles) as well as historical information known about the mobile device, may be used in selecting the second set of ambient profiles. Device specific selection may allow for differing selection based on different capabilities of the mobile device, such that the generic patterns generated therefrom are device-specific. For example, a device which does not include a particular sensor may have a different second set of ambient profiles that operates as a control group than a device that include the particular sensor. In one example, historical presence of a mobile device may be used to provide information about a pattern to be extracted. For example, if the mobile device is known to be associated with a particular location then that device's history may represent an explicit pattern for that location. Alternatively, if a device is known never to actually enter a location, the may be used to provide information about generic patterns for that location.

Further, while it is discussed above that the pattern extraction module 230 and association module 240 of the location information management application 150 on the computer 100 may determine one or more patterns from ambient profiles independent of other devices, it should be understood that feedback from mobiles devices at a location (e.g., beacons) may also be utilized in such determinations. This feedback may be provided via an explicit channel where the mobile device signals a probability of association. Alternatively, the feedback may be provided implicitly from the device via known usage patterns or lack of usage patterns expected for the device. Both the pattern extraction module 230 and association module 240 can take this feedback into account. In certain implementations, other devices at a location (e.g., a beacon) may provide location information to a mobile device that can be used as feedback. For example, a beacon may broadcast its own beacon profile, and a mobile device may collect this information and send it back to the location information management application 150 on the computer 100.

As part of providing feedback, a mobile device may request associations and profiles from other nearby devices. The mobile device may also request information about the other device's explicit or implicit estimate of the performance of associations and profiles. The target device can then use neighboring device estimate of performance and profiles as well as information about properties of the neighboring device (such as actions taken, relative location, distance to) and integrate this into its own decision process. Such a neighborhood of devices may also share and utilize the explicit/implicit feedback signals to improve the associations and profiles of the neighborhood as a whole.

Finally, while specific example hardware and software is discussed above, it should be understood that the techniques may be implemented using a variety of different types of hardware, software, and combination thereof. Such hardware may include a variety of types of processors, memory chips, programmable logic circuits, application specific integrated circuits, and/or other types of hardware components that support execution of software. Such software may include executable instructions that implement applications stored in a non-transitory machine-readable medium, such as a volatile or persistent memory device, a hard-disk, or other data store. Combinations of software and hardware may be adapted to suit different environments and applications. Above all, it should be understood that the above descriptions are meant to be taken only by way of example.

What is claimed is:

1. A method comprising,
    selecting, by one or more electronic devices, one or more location profiles;
    selecting, by the one or more electronic devices, a subset of ambient profiles, the subset of ambient profiles including beacon profiles for beacons that are located within an area surrounding one or more geographic locations of the location profiles or sensor profiles for sensor readings captured by sensors of mobile devices within the area surrounding one or more geographic locations of the location profiles;
    extracting, by the one or more electronic devices, one or more patterns from the subset of ambient profiles and using the patterns to generate associations between location profiles and ambient profiles in an association database which semantically associates location profiles with ambient profiles independent of geographic location;
    receiving, by the one or more electronic devices, a request from a mobile device that includes at least one of ambient information or a determined geographic location of the mobile device;
    in response to the request, accessing the association database to determine one or more location profiles from one or more ambient profiles that coincide with the ambient information in the request, or one or more ambient profiles from one or more location profiles that coincide with the determined geographic location in the request; and
    returning information from the one or more determined profiles to the mobile device.

2. The method of claim 1, wherein the ambient profiles are beacon profiles.

3. The method of claim 2, wherein the beacons include at least Wi-Fi access points (APs), Bluetooth Low Energy (BLE) devices, or cellular base stations.

4. The method of claim 1, wherein the ambient profiles are sensor profiles.

5. The method of claim 4, wherein the sensor profiles include information describing light, magnetic field, pressure, sound, or received signal strength captured by one or more sensors of the one or more mobile devices.

6. The method of claim 1, wherein the request includes identity information for one or more beacons whose wireless signals were observed by the mobile device or sensor readings of sensors of the mobile device, and the returned information includes a location produced using the association database.

7. The method of claim 1, wherein the request includes a determined geographic location of the mobile device, and the returned information includes a tile related to the geographic location determine using the association database.

8. The method of claim 1, wherein the one or more location profiles include a venue profile and the returned information includes an indication, or is usable to produce an indication, of an identity of a venue.

9. The method of claim 8, wherein the one or more geographic locations of the one or more location profiles are a geographic location of a venue associated with the one or more location profiles, and the first area is defined by a radius about the geographic location of the venue.

10. The method of claim 8, wherein the one or more geographic locations of the one or more location profiles are geographic locations of venues of a venue chain, and the first area is defined by radii about the geographic locations of the venues of the venue chain.

11. The method of claim 1, wherein the one or more location profiles are a single location profile, and the returned information includes an indication, or is usable to produce an indication, that the mobile device is at a particular geographic location indicated by the single location profile.

12. The method of claim 1, wherein the one or more location profiles are a plurality of location profiles, and the returned information includes a history, or is usable to produce a history, of visited locations.

13. The method of claim 1, wherein the returned information includes an indication, or is usable to produce an indication, that the mobile device is inside of a geofence associated with the one or more location profiles.

14. The method of claim 1, wherein the returned information includes a street address retrieved from one or more location profiles.

15. A method comprising,
    selecting, by one or more electronic devices, one or more location profiles;
    selecting, by the one or more electronic devices, a first subset of ambient profiles, the subset of ambient profiles including beacon profiles for beacons that are located within a first area surrounding one or more geographic locations of the location profiles or sensor profiles for sensor readings captured by sensors of mobile devices within the first area surrounding one or more geographic locations of the location profiles;
    selecting, by one or more electronic devices, a second subset of the ambient profiles;
    extracting, by the one or more electronic devices, one or more potential patterns from the first subset of ambient profiles;
    extracting, by the one or more electronic devices, one or more generic patterns from the second subset of ambient profiles;
    removing from the potential patterns any of the one or more generic patterns to produce one or more remaining patterns;
    generating associations between location profiles and ambient profiles in an association database based on the one or more remaining patterns;
    receiving, by the one or more electronic devices, a request from a mobile device that includes at least one of ambient information or a determined geographic location of the mobile device;
    in response to the request, accessing the association database to determine one or more location profiles from one or more ambient profiles that coincide with the ambient information in the request, or one or more ambient profiles from one or more location profiles that coincide with the determined geographic location in the request; and
    returning information from the one or more determined profiles to the mobile device.

16. A non-transitory electronic-device readable medium having instructions stored thereon, the instructions when executed on one or more processors of one or more electronic devices operable to:

select one or more location profiles;
select a subset of ambient profiles, the subset of ambient profiles including beacon profiles for beacons that are located within an area surrounding one or more geographic locations of the location profiles or sensor profiles for sensor readings captured by sensors of mobile devices within the area surrounding one or more geographic locations of the location profiles;
extract one or more patterns from the subset of ambient profiles and use the patterns to generate associations between location profiles and ambient profiles in an association database which semantically associate location profiles with ambient profiles independent of geographic location;
receive a request that includes at least one of ambient information or a determined geographic location of a mobile device;
in response to the request, access the association database to determine one or more locations profile from one or more ambient profiles that coincide with the ambient information in the request, or one or more ambient profiles from one or more location profiles that coincide with the determined geographic location in the request; and
return information from the one or more determined profiles.

17. The non-transitory electronic-device readable medium of claim 16, wherein the request includes identity information for one or more beacons whose wireless signals were observed by the mobile device or sensor readings of sensors of the mobile device, and the returned information includes a location for the mobile device.

18. The non-transitory electronic-device readable medium of claim 16, wherein the request includes a determined geographic location of the mobile device, and the returned information includes a tile related to the geographic location produced using the association database.

19. The non-transitory electronic-device readable medium of claim 16, wherein the one or more location profiles include a venue profile and the returned information includes an indication, or is usable to produce an indication, of an identity of a venue.

20. The non-transitory electronic-device readable medium of claim 16, further comprising instructions that when executed are operable to:
based on the associations between the ambient profiles and the location profiles, update one or more ambient profiles or location profiles.

* * * * *